United States Patent

[11] 3,597,024

[72] Inventor Dietrich E. Singelmann
 Ottobrunn, Germany
[21] Appl. No. 857,337
[22] Filed Sept. 12, 1969
[45] Patented Aug. 3, 1971
[73] Assignee Messerschmitt-Bolkow-Blohm Gesellschaft
 Mit Beschrankter Haftung
 Munich, Germany

[54] LIQUID RING SEAL
 2 Claims, 1 Drawing Fig.
[52] U.S. Cl............................................. 308/36.3,
 184/6 TS, 184/6 D, 277/67, 277/70 S.P.
[51] Int. Cl............................................ F16c 33/76
[50] Field of Search................................ 308/36.3,
 187, 76; 184/6, 6 TS, 6 D; 277/13, 67, 70 SP

[56] References Cited
 UNITED STATES PATENTS
 2,714,045 7/1955 Simenson............... 308/36.3
 3,286,791 11/1966 Coffer et al.............. 184/6

FOREIGN PATENTS
 427,776 4/1935 Great Britain................ 308/36.3

Primary Examiner—Martin P. Schwadron
Assistant Examiner—B. L. Grossman
Attorney—McGlew & Toren ABSTRACT: A liquid ring seal particularly suitable for shafts subject to high differential operating pressures across a rotatable element such as a turbine runner such as in a gas turbine includes means for supplying a lubricant through a central bore, through a check valve, and radially outwardly into a return conduction space formed adjacent the turbine runner seal gap. The construction is characterized by the formation of a throttle passage or gap which extends axially from the conduction space into an annular chamber having a ring valve which is located adjacent the shaft-supporting bearing. The ring valve produces a certain backwash or a longer dwell time of the lubricant stream in the zone of the packing directly adjacent the supporting bearing. When a predetermined backwash pressure is reached the valve lifts off its seat and the lubricant stream flows into the bearing. At least one of the throttle passages or control passages are provided for the discharge of the lubricant into the chamber alongside the support bearing.

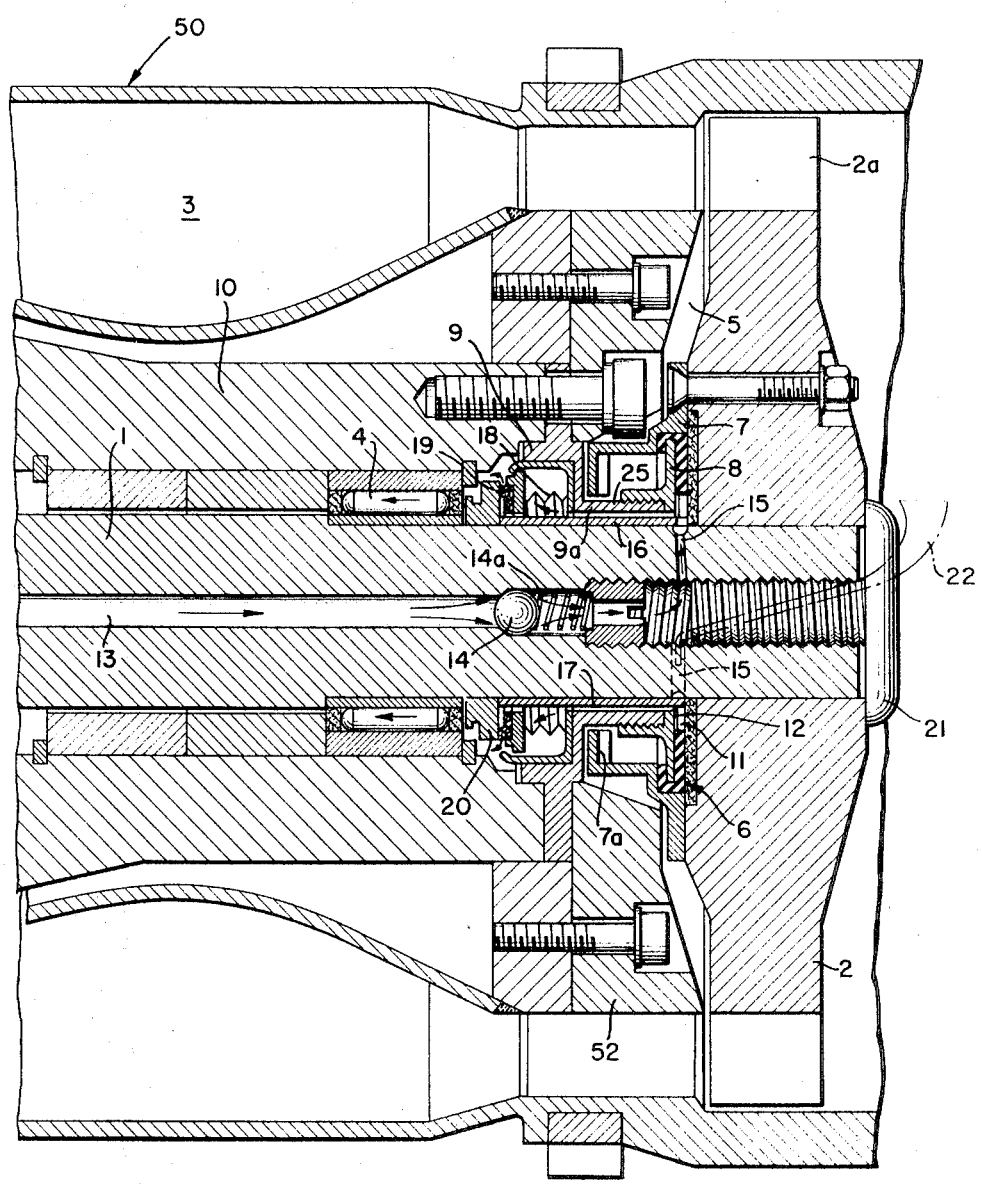

LIQUID RING SEAL

This invention relates in general to the constructions of seals for rotary parts and in particular to a new and useful liquid ring seal suitable for shafts operating at high pressure differential and which are supported by lubricated rotatable bearings such as needle bearings, and particularly for the shaft of a gas turbine for a liquid-fueled rocket engine, and which includes a return device arranged at the rotating part on the low-pressure side of the rotating turbine blade for effecting the return of the seal liquid.

With packings for sealing shafts of the above-mentioned type which use a seal ring of mercury, it is known to dispose cooling channels which are traversed by cooling medium in a forced flow in the zone of the seal ring. The heat evolving during the rotation of the shaft and a generation of frictional energy between the walls of the seal gap and the mercury is removed in order to prevent overheating of the seal ring and hence evaporation of the mercury. Such a known arrangement has a disadvantage that the cooling channels are difficult to form or construct and hence the material used must be a good heat conductor. In addition, the limited available space is additionally restricted in the zone of the seal by the arrangement of the coding channels. Lastly, the quantity of heat removable by a sealing liquid is limited because irrespective of the quantity of heat conduction of the material which is employed, an accumulation of heat in the channel walls cannot be avoided. Thus at high rotational speeds or circumferential speeds the danger of evaporation of the sealing liquid continues to exist.

In gas turbines, it is further known to charge the labyrinth packings of the shaft bearings on the turbine side with the sealing air so that a cooling veil of air is disposed ahead of the hot propellant gases in the turbine running gap. This method, however, involves a disadvantage of a certain power loss of the thermodynamic process since a large quantity of sealing air must be taken from the compressor.

A centrifugal seal with sealing liquid for vertical shafts and high pressure difference is known where the sealing liquid which is a good electrical conductor is set in rotation by means of electrical rotary fields. According to this known arrangement there are present in the zone of the seal one or more cooling elements which are intended to prevent evaporation of the sealing fluid. Such a device is disclosed in German Pat. No. 875,746 but the details of the cooling elements and the mode of operation of the cooling device is not disclosed.

The problem of the present invention is to provide, by simple means, a seal which is operationally safe even when operating under great pressure differential as well as high speeds of shaft rotation, and in particular, to avoid the danger of evaporation of the sealing liquid. In accordance with the invention a packing seal includes means for supplying lubricants into a return connection space which lies radially within the liquid seal ring that forms, and to provide between this space and the bearing for supporting the shaft at least one channel for the discharge of a lubricant. This arrangement provides a contact and hence a direct heat exchange between the seal liquid of high specific gravity and the lubricant of lower specific gravity. The best heat transmission from the seal liquid of high specific gravity and the lubricant of lower specific gravity results because a passage of heat through the interposed wall is avoided. This is the cheapest solution for the heat exchanger, which in this case is fully operational because of the very different density of the two liquids and the great radial accelerations occurring in the operation so that the two liquids do not commingle.

In accordance with a further feature of the invention, it is proposed to arrange the feedline for the lubricant in the rotating shaft and this lubricant issues through radial bores in the zone of the return conduction space around the shaft. Due to the high speed of rotation of the shaft, the lubricant receives an angular momentum which is maintained upon its exit so that there exists a highly turbulent flow of the lubricant and thus a very good convective heat transmission.

In a further embodiment of the invention, the channel between the return conduction space and the bearing is designed as a cylindrical ring gap which is formed by a cylindrical sleeve which is connected with a housing by a ring which surrounds the shaft or bushing arranged thereon and is in spaced relationship therewith. By such a design the heat-absorbing surface of the quantity of lubricant flowing through the unit is increased over a given period of time. A ring valve bringing about a backwash or a small dwell time of the lubricant flow in the zone of the packing is arranged in front of the shaft bearing in respect to the direction of lubricant flow. This produces an increase of heat exchange between the heated liquid seal ring, or its hot surrounding area and the lubricant. Advantageously, one of the lubricant bores leading to the circumference of the shaft serves as means for filling the required quantity of seal liquid into the construction.

Accordingly, it is an object of the invention to provide an improved liquid seal construction particularly for a bearing rotatably supporting a shaft of a gas turbine wheel in a liquid fuel rocket engine which includes means such as a rotatable turbine blade portion for returning lubricant on the low-pressure side of a ring gap and wherein the lubricant is supplied through a conduit, for example, a bore of the shaft and preferably radially outwardly into a conduction space which carries at least one channel which extends from the space to the bearing.

A further object of the invention is to provide a liquid seal arrangement which will operate safely under great pressure differential and high rotative shaft speeds and which will permit circulation of the liquid in a manner to conduct away heat and prevent evaporation of the liquid.

A further object of the invention is to provide a liquid seal construction which is simple in design, rugged in construction and economical to manufacture.

GENERAL DESCRIPTION OF THE PREFERRED EMBODIMENT

Referring to the drawings in particular, the invention embodied therein comprises a shaft seal arrangement for a rotatable turbine shaft 1 of a liquid fuel rocket engine generally designated 50. A turbine runner or wheel 1 is mounted in an overhung position on the shaft 1 and it includes blading 2a which is admitted by propellant gases produced in a combustion chamber 3. The shaft suspension is effected by means of a pressure-rotation-lubricated antifriction bearing or needle bearing 4. To pack the bearing 4 against the running gap 5 defined between a turbine disk 52 and the turbine wheel 2 which is filled by hot propellant gases under high pressure, a liquid seal is provided. On the end face of the turbine wheel 2 on the side extending toward the shaft bearing 4, a radial blading 11 having low blade height is provided. The blading 11 comprising seal-liquid-pressurizing means runs in a return chamber or return conduction space 12. The space 12 is bounded by a ring disk 8 and an annular flange member 7 and it converges with a seal gap 6.

A housing 10 which supports the bearing 4 carries the turbine disk 52 and provides a cavity adjacent the turbine wheel 2 which accommodates a bushing 16 which is fitted over shaft 1. A cylindrical sleeve 9a is spaced radially from the bushing 16 and is connected with the housing by ring 9. A passage or throttle gap 17 is defined by the space between bushing 16 and sleeve 9a and extends from the conduction space 12 to a valve chamber 18 adjacent the bearing 4.

In accordance with the invention the shaft bearing 4 is continuously supplied with fresh lubricant during operation which passes through a central feed channel 13 which is located within the shaft 1. The supply of lubricant is controlled by a check valve 14 which permits flow through the valve of a predetermined pressure as set by its associated spring 14a.

through the surface of the seal liquid. From this point the lubricant stream extends in an axial direction to a plurality of radially extending passages or bores 15 which permit the outward hurling of the lubricant to the surface of the seal liquid in the return conduction space 12. The lubricant then passes through the throttle gap 17 into the chamber 18 having a ring valve 19 therein provided to produce a certain backwash or longer dwell time for the lubricant stream in the zone of the packing 4. The valve 19 is a relief valve which is biased closed by a spring bellows 25 located in the chamber 18. The valve 19 opens only after a predetermined oil pressure is reached in the chamber 18. When a certain backwash pressure is reached the ring valve 19 lifts off its seat 20 and the lubricant stream gets into the shaft bearing 4.

The turbine wheel 2 is axially connected with the shaft 1 by a connecting bolt 21. Before the bolt 21 is inserted a filling funnel 22 is introduced to permit the inflow of a mercury seal liquid which blows through the radial bore 15. A collecting space 7a for the lubricant is defined at one end of the annular flange lubricant 7.

The mode of operation of the invention is as follows:

Upon operation of the turbine, the seal liquid is brought to a high circumferential speed by the return blades 11, which act like the blading of a radial pump. This causes a high-pressure buildup which maintains the gas pressure in balance. As the delivery of the seal liquid is zero, the entire work by the return blades is transformed into heat. Due to the high speed of rotation of the turbine shaft 1, the lubricant flowing into the inlet bore 13 and the check valve 14 and the radial bores 15 will be pressed against the surface of the seal liquid and bring about a direct intensive heat exchange. Subsequently, the lubricant further cools the seal as it flows through gap 17. A low speed of flow is obtained by the ring valve 19 which opens and lets the lubricant through to the bearing 4 only when a predetermined limit pressure is reached.

What I claim is:

1. A liquid ring seal construction particularly for a rotatable turbine shaft of an engine such as a liquid-fueled thrust engine operating at high pressure differential, comprising a rotatable turbine shaft, a turbine-rotation-lubricated-bearing rotatably supporting said shaft, means defining a seal liquid return spice around said shaft, self-liquid-pressurizing means connected to said shaft and operable in the seal liquid return space, means for supplying lubricant at a predetermined pressure into said return space, means defining a passage extending from said return space to said bearing for the discharge of lubricant to said bearing including a cylindrical housing extending around and spaced from said shaft, a ring extending around said shaft in close proximity thereto enclosing a portion of one end of said housing, and a bushing engaged with said shaft and spaced from said ring and defining an annular gap comprising said passage, means around said shaft defining a chamber adjacent said bearing, and a ring valve in said chamber set to open at a predetermined pressure to permit flow of said lubricant from said bearing to said return space for causing a certain backwash or longer dwell per unit of time of the lubricant in said chamber in the zone of said bearing, said ring being in direct contact with said lubricant.

2. A seal according to claim 1, wherein said means for supplying lubricant comprises a bore defined axially through said shaft and a plurality of radial passages in said shaft communicating with said bore and with said return space.

UNITED STATES PATENT OFFICE
CERTIFICATE OF CORRECTION

Patent No. 3,597,024        Dated August 3, 1971

Inventor(s) Dietrich E. Singelmann

It is certified that error appears in the above-identified patent and that said Letters Patent are hereby corrected as shown below:

Cancel columns 1 and 2 of the printed patent and substitute the attached columns 1 and 2.

Signed and sealed this 9th day of April 1974.

(SEAL)
Attest:

EDWARD M. FLETCHER, JR.
Attesting Officer

C. MARSHALL DANN
Commissioner of Patents